(12) United States Patent
Price et al.

(10) Patent No.: US 10,204,262 B2
(45) Date of Patent: Feb. 12, 2019

(54) INFRARED IMAGING RECOGNITION ENHANCED BY 3D VERIFICATION

(71) Applicant: Microsoft Technology Licensing, LLC, Redmond, WA (US)

(72) Inventors: Raymond Kirk Price, Redmond, WA (US); Michael Bleyer, Seattle, WA (US); Jian Zhao, Kenmore, WA (US); Denis Demandolx, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 15/403,707

(22) Filed: Jan. 11, 2017

(65) Prior Publication Data

US 2018/0196998 A1 Jul. 12, 2018

(51) Int. Cl.
| | |
|---|---|
| *G06K 9/00* | (2006.01) |
| *H04N 5/225* | (2006.01) |
| *G06T 7/593* | (2017.01) |
| *G01S 17/02* | (2006.01) |
| *G01S 17/89* | (2006.01) |
| *H04N 5/33* | (2006.01) |
| *G06T 7/586* | (2017.01) |
| *H04N 13/254* | (2018.01) |

(52) U.S. Cl.
CPC ........ *G06K 9/00288* (2013.01); *G01S 17/023* (2013.01); *G01S 17/89* (2013.01); *G06K 9/00255* (2013.01); *G06K 9/00268* (2013.01); *G06T 7/586* (2017.01); *G06T 7/593* (2017.01); *H04N 5/2256* (2013.01); *H04N 5/332* (2013.01); *H04N 13/254* (2018.05); *G06T 2207/10028* (2013.01); *G06T 2207/10048* (2013.01); *G06T 2207/10152* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 7,508,960 | B1 | 3/2009 | Bolle et al. |
| 8,933,783 | B2 | 1/2015 | Brangoulo et al. |

(Continued)

FOREIGN PATENT DOCUMENTS

| | | |
|---|---|---|
| DE | 102007006566 A1 | 8/2008 |
| WO | 2016020073 A1 | 2/2016 |

OTHER PUBLICATIONS

Dwivedi, et al., "Masked Face Detection based on Micro-Texture and Frequency Analysis", In International Journal of Current Engineering and Technology, vol. 5, Issue 2, Apr. 2015, pp. 1277-1281.

(Continued)

*Primary Examiner* — Kevin Ky
(74) *Attorney, Agent, or Firm* — Ray Quinney & Nebeker P.C.; John O. Carpenter

(57) ABSTRACT

A three-dimensional (3D) image system recognition system includes a flood light source, a structured light source, and an imaging sensor. The flood light source and the structured light source emit lights in the substantially same wavelength range. The imaging sensor collects one or more images generated from a reflection of the flood light source, and collects one or more images generated from a reflection of the structured light source.

20 Claims, 5 Drawing Sheets

(56) References Cited

U.S. PATENT DOCUMENTS

| | | | |
|---|---|---|---|
| 9,075,975 B2 | 7/2015 | Bud | |
| 2008/0251694 A1* | 10/2008 | Tanimoto | H01L 27/14621 250/208.1 |
| 2013/0015946 A1* | 1/2013 | Lau | G07C 9/00 340/5.2 |
| 2013/0088726 A1 | 4/2013 | Goyal et al. | |
| 2014/0049373 A1 | 2/2014 | Troy et al. | |
| 2015/0092258 A1 | 4/2015 | Herschbach et al. | |
| 2015/0341619 A1* | 11/2015 | Meir | G01S 17/06 348/47 |
| 2016/0071275 A1 | 3/2016 | Hirvonen | |
| 2016/0140405 A1 | 5/2016 | Graumann et al. | |
| 2016/0260223 A1 | 9/2016 | Gren et al. | |

OTHER PUBLICATIONS

Maatta, et al., "Face Spoofing Detection From Single Images Using Micro-Texture Analysis", In Proceedings of the International Joint Conference on Biometrics, Oct. 11, 2011, 7 pages.

Yan, et al., "Face Liveness Detection by Exploring Multiple Scenic Clues", In Proceedings of 12th International Conference on Control Automation Robotics & Vision, Dec. 5, 2012, 6 pages.

Gao, et al., "Single-View Recaptured Image Detection Based on Physics-Based Features", In Proceedings of IEEE International Conference on Multimedia and Expo, Jul. 19, 2010, 6 pages.

Tsalakanidou, et al., "A Secure and Privacy friendly 2d+3d face Authentication System Robust under Pose and Illumination Variations", In Proceedings of Eighth International Workshop on Image Analysis for Multimedia Interactive Services, Jun. 6, 2007, 4 pages.

Tan, et al., "Face Liveness Detection from a Single Image with Sparse Low Rank Bilinear Discriminative Model", In Proceedings of the 11th European conference on Computer vision, Sep. 5, 2010, 14 pages.

Kose, et al., "Classification of Captured and Recaptured Images to Detect Photograph Spoofing", In Proceedings of International Conference on Informatics, Electronics & Vision, May 18, 2012, 6 pages.

Galbally, et al., "Face Anti-Spoofing Based on General Image Quality Assessment", In Proceedings of 22nd International Conference on Pattern Recognition, Aug. 24, 2014, pp. 1173-1178.

Otsu, Nobuyuki, "A Threshold Selection Method from Gray-Level Histograms", In Proceedings of IEEE Transactions on systems, man, and cybernetics, vol. 9, Issue 1, Jan. 1979, pp. 62-66.

"International Search Report and Written Opinion Issued in PCT Application No. PCT/US2017/068850", dated Apr. 19, 2018, 13 Pages.

* cited by examiner

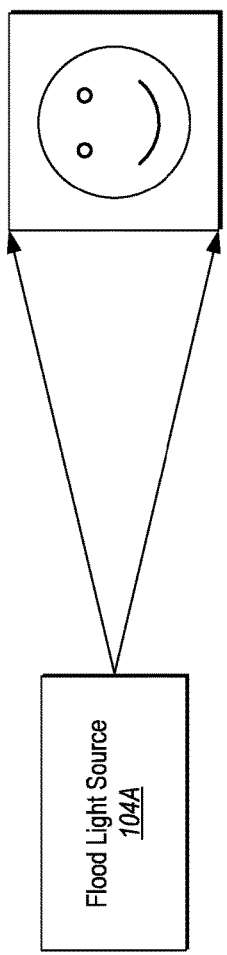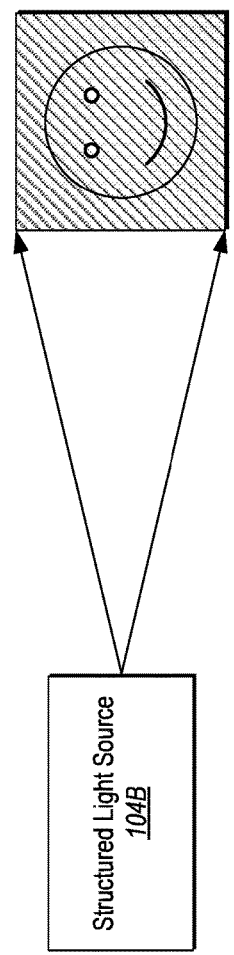
*Figure 3A*
*Figure 3B*

INFRARED IMAGING RECOGNITION ENHANCED BY 3D VERIFICATION

CROSS-REFERENCE TO RELATED APPLICATIONS

N/A

BACKGROUND

Background and Relevant Art

Three-dimensional (3D) image recognitions are commonly achieved by 3D reconstruction from 2D images. 3D image recognition systems commonly use an imaging sensor, such as a camera, taking pictures of an object. The system, then, reconstructs the 3D information from the 2D image (the picture taken by the camera) based on the pixel colors. These kinds of systems, even with high-definition imaging capability, could fail in situations that a photograph of the identifying person is placed in front of it, because these systems cannot tell the true dimension of the identifying object.

3D stereo cameras can be used to produce 3D images. They include one or more lenses with a separate imaging sensor for each lens. This allows the cameras to simulate human binocular vision, and therefore gives it the ability to capture 3D images, a process known as stereo photography. Traditional stereo cameras include at least two identical RGB cameras, which would cost at least twice as much as a regular camera with the similar definition.

There are other higher cost three-dimensional (3D) imaging systems, in which the depth information is collected using a time-of-flight imaging system or a structured light imaging system that utilizes infrared light to calculate distances. Both time-of-flight imaging systems and structured light imaging systems generally require an artificial light source. Having a light source makes the system more energy consuming and costly.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some disclosed embodiments, a three-dimensional (3D) image recognition system comprises a flood light source, a structured light source, and an imaging sensor. The flood light source and the structured light source emit light in a substantially same wavelength range. The imaging sensor is configured to collect at least a first image from a reflection of the flood light source and at least a second image from a reflection of the structured light from the object.

Both the flood light source and the structured light source, in some embodiments, emit infrared light. The imaging sensor is an infrared imaging sensor.

In some embodiments, the 3D image recognition system further comprises a processor, configured to reconstruct the structure of the object based on the second image collected from a reflection of the structured light from the object.

The processor, in some embodiments, is further configured to access a data source including authentication data of a pre-determined item, and to compare the collected images to the authentication data.

When the authentication data includes 3D information or the system can reconstruct 3D information from the authentication data, the processor compares the depth information extracted from the images collected to the 3D information obtained or reconstructed from the authentication data, in addition to comparing the images collected to the image stored in the storage device.

In some other embodiments, the flood illumination source and the structured illumination source are configured to illuminate concurrently; and the image sensor is configured to collect at least an image of a reflection of the overlay flood and structured light from the object. The processor is further configured to extract at least a portion of the reflection generated by the structured illumination source from the collected overlay image.

Disclosed embodiments also include methods for performing three-dimensional image recognition with the disclosed systems. These methods include illuminating flood light at an object, illuminating structured light at the object, and collecting at least an image of the object from a reflection of the flood light and at least an image of the object from a reflection of the structured light. The flood light and the structured light are within substantially same wavelength range. These methods also include that identifying the structure of the object based on the image collected from the reflection of the structured light. These methods also include that accessing authentication data of a pre-determined item, and comparing the one or more collected images to the authentication data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3A illustrates the flood light source 104A of FIG. 1 illuminating a 2D object, according to at least one embodiment of the present disclosure.

FIG. 3B illustrates the structured light source 104B of FIG. 1 illuminating a 2D object, according to at least one embodiment of the present disclosure.

DETAILED DESCRIPTION

This disclosure generally relates to devices, systems, and methods for three-dimensional (3D) image recognition and biometric authentication systems. More particularly, the present disclosure relates to 3D image recognition using collection of image data generated from reflected light from a flood light source and from a structured light source. The present disclosure relates to the production of a flood output light, a structured output light, receipt of reflected flood light, receipt of reflected structured light, and collection of a reflected flood light and structured light to recognize the 3D information of an object.

In some disclosed embodiments, a 3D image recognition system comprises a flood light source, a structured light source, and an imaging sensor. The flood light source and the structured light source emit light in substantially the same wavelength range. In some embodiments, the imaging sensor is configured to collect at least a first image from a reflection of the flood light and at least a second image from a reflection of the structured light from the object. In other embodiments, the imaging sensor is configured to collect at least a combined image including a reflection of the flood light and the structured light from the object.

Figure 1:
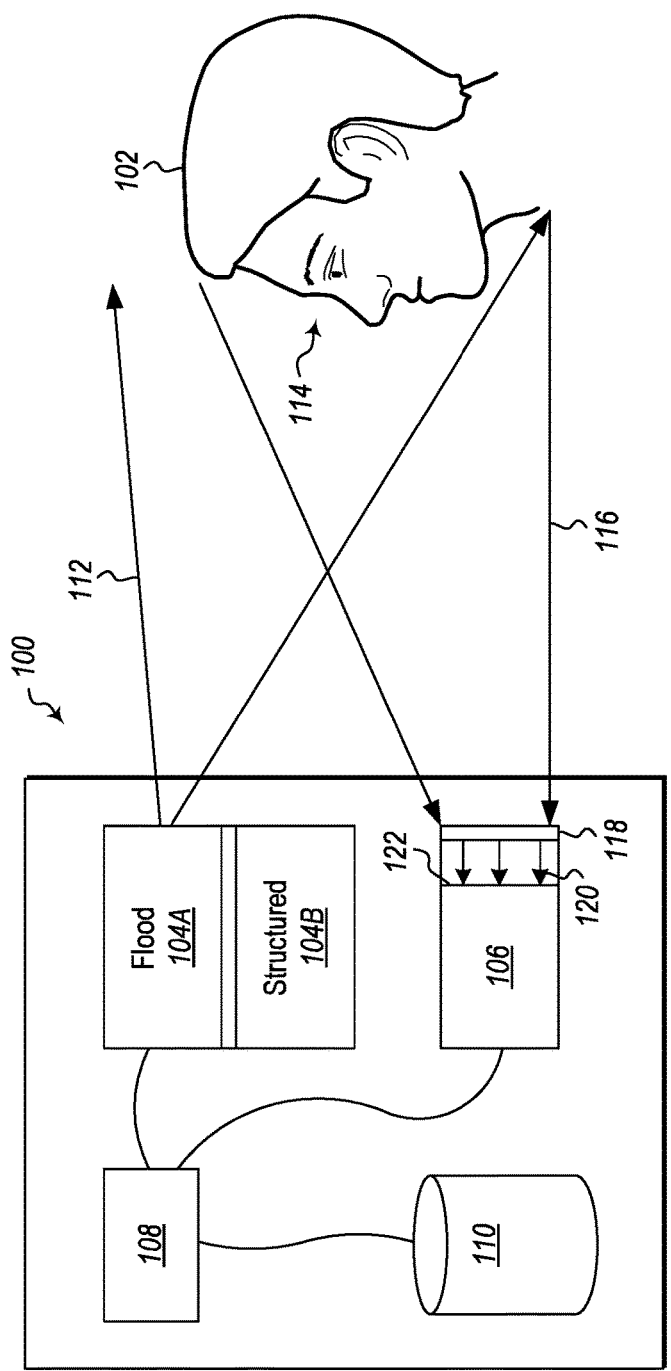
FIG. 1 illustrates a 3D image recognition system comprising a flood light source and a structured light source, according to at least one embodiment of the present disclosure.

FIG. 1 illustrates a schematic representation of a 3D image recognition system 100 imaging an object 102. The 3D image recognition system 100 includes a flood light source 104A and a structured light source 104B, which emit light in a substantially same wavelength range. The system 100 also includes an imaging sensor 106. The flood light source 104A, the structured light source 104B, and the imaging sensor 106 are in data communication with one or more hardware processors 108 configured to control and/or coordinate data flow and operation of the flood light source 104A, the structured light source 104B, and the imaging sensor 106. In some embodiments, the one or more processors 108 may be a single processor that receives and sends information and commands to the flood light source 104A, the structured light source 104B, and the imaging sensor 106, as shown in FIG. 1. In other embodiments, the one or more processors 108 may be a plurality of processors, such as individual processors or controllers configured to control and/or coordinate one of the flood light source 104A, the structured light source 104B or the imaging sensor 106.

The processor 108 processes the image of an object from a reflection of the structured light 104B and extracts the 3D information based on the curves and twist of the structured pattern.

In some embodiments, both the flood light source and the structured light source emit infrared light, and the imaging sensor is an infrared imaging sensor. In some other embodiments, the light sources can be visible light or other invisible light, such as ultraviolet light.

In some embodiments, the emitted light 112 from the flood light source 104A and the structured light source 104B is emitted within an infrared wavelength range centered around a peak wavelength within a range between about 750 nm and about 1000 nm. In some embodiments, the emitted infrared wavelength range has a full width half maximum spectral width less than about 75 nanometers (nm), 70 nm, 65 nm, 60 nm, 50 nm, 45 nm, 40 nm, 35 nm, 30 nm, 25 nm, 20 nm, 15 nm, 10 nm, 5 nm, 1 nm, or any values therebetween. For example, the emitted light 112 may have a peak wavelength between 800 and 875 nm, and a spectral full width half maximum of 0.1 to 10 nm. In some examples, the emitted light 112 may have a peak wavelength between 800 and 875 nm, and a spectral full width half maximum of 0.1 to 30 nm. In other examples, the emitted light 112 may be within an emitted infrared wavelength range from 850 nm to 900 nm. In yet other examples, the emitted light 112 may be within an emitted infrared wavelength range from 825 nm to 860 nm.

The imaging sensor 106 and the structured light source 104 may be displaced from one another. For example, there may be a disparity in the position of the structured light source 104 and imaging sensor 106 relative to the object 102 being imaged.

In some embodiments, the imaging sensor 106 has a bandpass filter 118 that attenuates at least a portion of the incoming reflected light 116 around the illuminator spectral range to produce a filtered light 120. The filtered light 120 is then detected and captured by a photosensor array 122. For example, the imaging sensor 106 may by a hybrid imaging sensor and include an array of photoreceptors, at least some of which may have different spectral response curves. At least some of the photoreceptors may have a spectral response curve exhibiting sensitivity to light inside the visible wavelength range and some photoreceptors with a spectral response curve exhibiting sensitivity to light in the infrared range at and/or near the peak wavelength of the emitted light. The bandpass filter 118 may pass light in the visible wavelength range and in the infrared range at and/or near the peak wavelength of the emitted light, while attenuating the light outside the visible wavelength range and in the infrared range at and/or near the peak wavelength of the emitted light to differentiate the image data at each photoreceptor and reduce crosstalk in the image data.

Figure 2A:
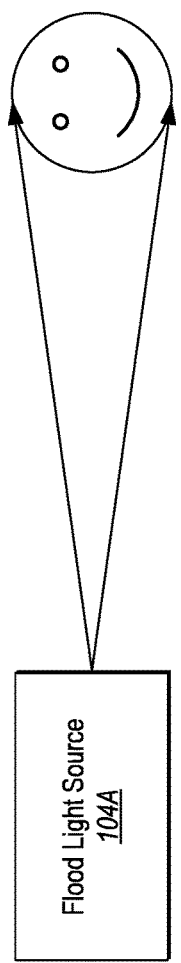
FIG. 2A illustrates the flood light source of FIG. 1 illuminating a 3D object, according to at least one embodiment of the present disclosure.
Figure 2B:
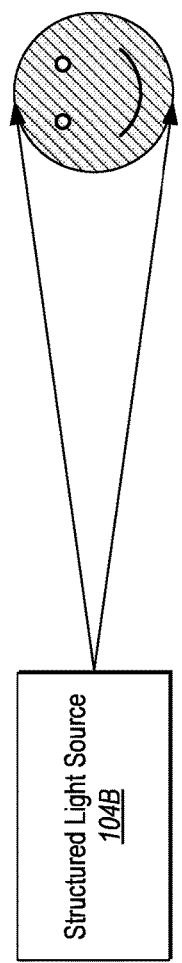
FIG. 2B illustrates the structured light source 104B of FIG. 1 illuminating a 3D object, according to at least one embodiment of the present disclosure.

FIG. 2A illustrates that the flood light source 104A of FIG. 1 emits flood light at a person's face. FIG. 2B illustrates the structured light source 104B in FIG. 1 emitting structured light at the same person's face. Structured light is a patterned light, often nodal grids or grids of one or more bars (horizontal and/or vertical). In some embodiments, the structured light is provided by passing light through a diffraction grating. In other embodiments, the structured light is provided by passing light through a filter that physically blocks or attenuates areas of the light. When the structured light is projected on a 3D object, the patterns projected by the structured light deform when the reflected light is viewed by the imaging sensor. Based on the way and/or amount the patterns deform, the system is capable of calculating the depth and surface information of the object in the scene.

In some embodiments, the system may calculate a maximum of 5, 6, 7, 8, 9, 10, 11, 12, 13, 14, 15, or more areas of the structured light illuminated image to create a sparse depth map of the collected images. The sparse depth map may be compared against geometric templates that may be created by a photograph (i.e., flat or without varying depth values) or by a folded and/or bent photograph (i.e., cylindrical, spherical, prismatic, trapezoidal, triangular, etc.).

FIG. 3A illustrates that the flood light source 104A of FIG. 1 emits flood light at a photograph of a person. An imaging sensor alone is generally not capable of differentiating an object and a photograph of the object in flood light.

FIG. 3B illustrates the structured light source 104B of FIG. 1 emitting structured light at the same photograph. When the structured light illuminates a flat photo, the patterns do not deform. Additionally, the patterns are reflected in the area surrounding the face in the photograph, continuing the structured light pattern beyond the visual boundaries of the face. Both the continuation of the structured light pattern beyond the face and the lack of deformation of the structured light pattern on the face may indicate the face is a false representation of the user.

Referring again to FIG. 1, the system 100 could further include a storage device 110 in data communication with the processor 108. The storage device 110 stores authentication data of a pre-determined item, for instance, a user's facial information. In some circumstances, the authentication data may only include 2D characteristics of a pre-determined item. For example, the authentication data may be user information, including a 2D image of the user. The processor may verify the 2D image collected by the imaging sensor against the 2D information in the authentication data. The processor may also verify whether the extracted 3D information shows that the object is flat, trapezoidal, triangular, cylindrical, spherical, or any shape corresponding to anticipated geometric templates, as described herein. In other examples, the processor may verify that the 3D information matches an allowed human template. In at least one example, the 3D information must be matched to an individual user's profile. So long as the 3D information does not show that the object is flat or is one of the geometric templates that is not an allowed human template, it may pass the 3D verification.

In some other embodiments, after accessing the 2D photograph of a user in the storage device 110, the processor may reconstruct the 3D information of the user's face based on the 2D photo's pixel colors. In some other embodiments, the authentication data includes both 2D information and 3D information of an object.

When the authentication data includes 3D information or the system can reconstruct 3D information from the authentication data, the processor compares the depth information extracted from the images collected to the 3D information obtained or reconstructed from the authentication data, in addition to comparing the images collected to the image stored in the storage device 110.

In some other embodiments, the flood light source 104A and the structured light source 104B may be combined as one light source, which is capable of selectively emitting flood light and structured light.

In some embodiments, the flood illuminate source 104A and the structured illumination source 104B are configured to illuminate alternately. The imaging sensor 106 may be capable of taking multiple photos sequentially to capture a first image illuminated by the flood light and a second image illuminated by the structured light. In some embodiments, the imaging sensor 106 may collect a series of images to average the flood-illuminated images together to form a first image while separating interleaved structured light-illuminated images and averaging the structured light-illuminated images to form a second image.

In some other embodiments, the flood light source 104A and the structured light source 104B are configured to illuminate concurrently; and the image sensor 106 is configured to collect an image of the reflected light 116 including both flood illumination and structured light illumination from the object 102. The processor 108 is further configured to identify and extract the structured light pattern from the combined image.

Figure 4:
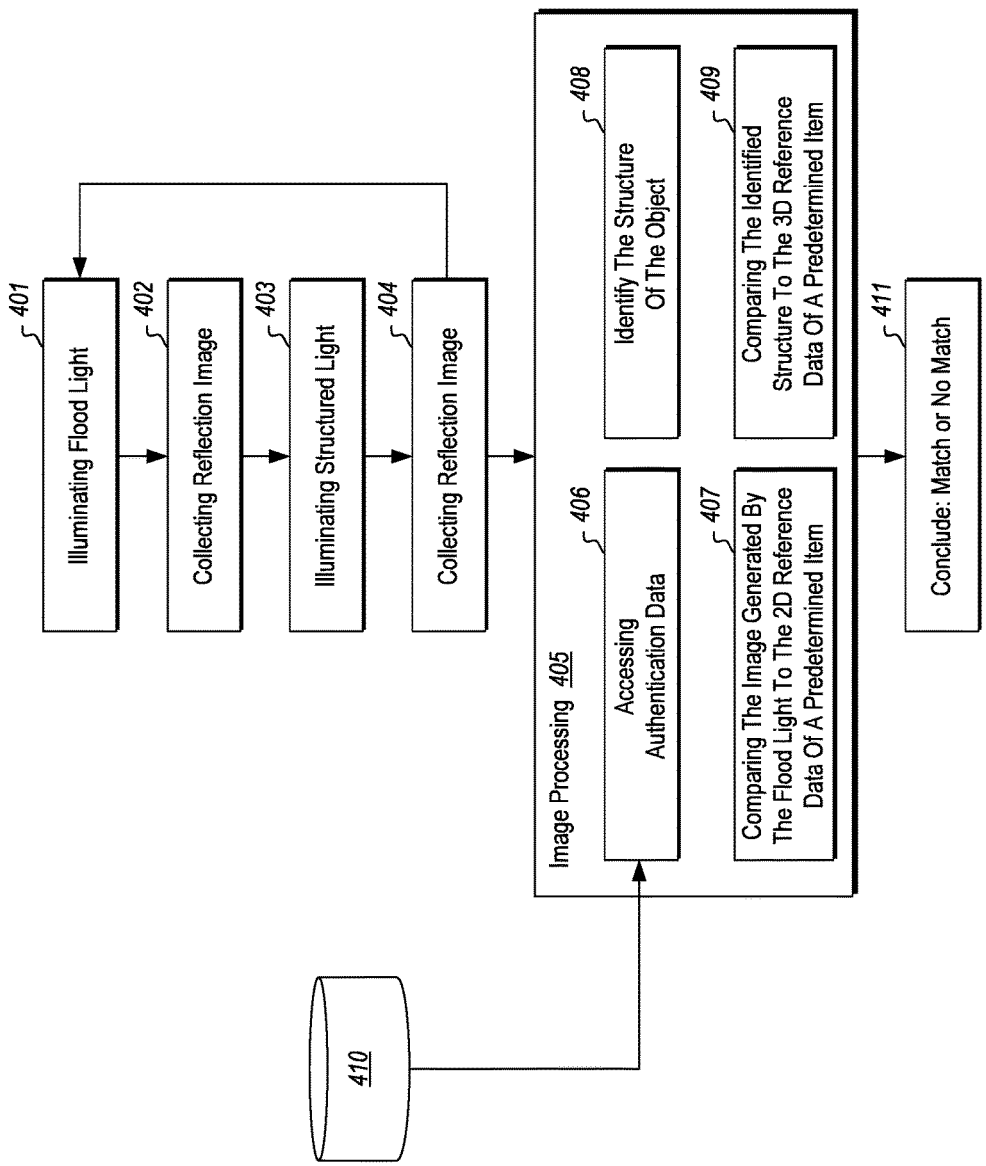
FIG. 4 illustrates a flow chart of a method for recognizing 3D information of an object by illuminating with flood light and structured light alternately, according to at least one embodiment of the present disclosure.

FIG. 4 illustrates a flow chart of an embodiment of a method for 3D image recognition. The method includes an act 401 of illuminating an object with flood light, an act 402 of collecting an image of an object from the reflection of the flood light, an act 403 of illuminating an object with structured light, and an act 404 of collecting an image of the object from the reflection of the structured light. The method also includes an act 405 of image processing. The act 405 of image processing comprises an act 406 of accessing a data source 410 to obtain authentication data of a predetermined item, an act 408 of identifying the structure (e.g., calculating one or more depth values) of the object, an act 409 of comparing the identified structure of the object to the 3D information of the authentication data, and an act 407 of comparing the image generated from the flood light source to the 2D information of the authentication data. The method further includes an act 411 of determining whether the object detected matches the authentication data accessed.

Figure 5:
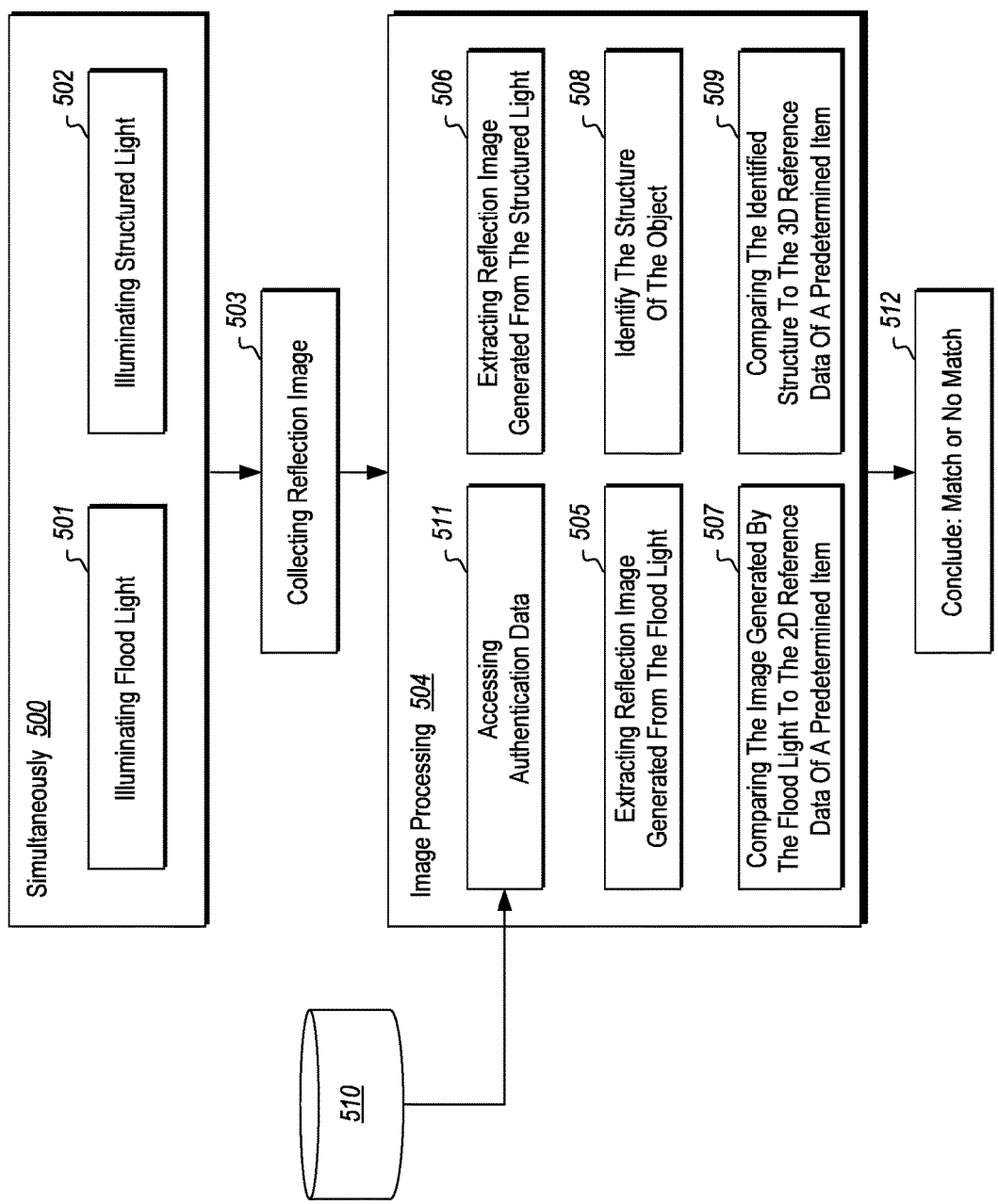
FIG. 5 illustrates a flow chart of a method for recognizing 3D information of an object by illuminating flood light and structured light simultaneously and extracting the image generated from the structured light and flood light afterwards, according to at least one embodiment of the present disclosure.

FIG. 5 illustrates a flow chart of another embodiment of a method for 3D image recognition. The method includes an act 501 of illuminating an object with flood light, and an act 502 of illuminating an object with structured light. The act 501 of illuminating an object with flood light and the act 502 of illuminating an object with structured light are performed simultaneously. The method also includes an act 503 of collecting an image of a reflection from the combined light sources and performing one or more image processing 504 routines on the combined image. For example, the method may include an act 506 of extracting the structured light image data from the combined image, and an act 505 of extracting the image data generated from the flood light from the combined image.

The method further includes an act 511 of accessing a data source 510 to obtain authentication data of a predetermined item. The image processing 504 may include an act 508 of identifying the structure (e.g., calculating one or more depth values) of the object. The 2D information and any 3D information may be then compared against the available user information at an act 509 of comparing the identified structure of the object to the 3D information of the authentication data, and an act 507 of comparing the image generated from the flood light source to the 2D information of the authentication data. The method then includes an act 512 of determining whether the object detected matches the authentication data accessed.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein is combinable with any element of any other embodiment described herein, unless such features are described as, or by their nature are, mutually exclusive.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value. Where ranges are described in combination with a set of potential lower or upper values, each value may be used in an open-ended range (e.g., at least 50%, up to 50%), as a single value, or two values may be combined to define a range (e.g., between 50% and 75%).

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for improved anti-spoofing in 3D image recognition, comprising
    a flood illumination source, configured to emit flood light in a first wavelength range;
    a structured illumination source, configured to emit structured light in the first wavelength range;
    an imaging sensor, configured to collect at least a first image from a reflected portion of the flood light and at least a second image from a reflected portion of the structured light; and
    a processor in data communication with the flood illumination source, the structured illumination source, and the imaging sensor, the processor configured to:
    identify a quantity of landmark areas in the second image collected from the reflected portion of the structured light, the quantity consisting of a lower threshold of 5 and an upper threshold of 15,
    calculate depth values of the landmark areas based on the second image to create a sparse depth map including the landmark areas,
    compare the sparse depth map against one or more geometric templates, and
    determine whether the sparse depth map matches the one or more geometric templates and authenticate a user.

2. The device of claim 1, wherein the first wavelength range is infrared.

3. The device of claim 1, the processor further configured to identify the landmark areas based on the first image collected from the reflected portion of the flood light.

4. The device of claim 1, wherein the processor is in data communication with a storage device further, and configured to:
    access authentication data of a pre-determined item in the storage device; and
    compare at least one of the first image and the second image to the authentication data of the pre-determined item.

5. The device of claim 4, wherein the authentication data includes 2D characteristics of the pre-determined item, and
    wherein comparing the at least one of the first image and second image to the authentication data of the pre-determined item further comprises comparing the first image to the 2D characteristics of the pre-determined item.

6. The device of claim 4, wherein the authentication data includes 3D characteristics of the pre-determined item,
    wherein comparing the at least one of the first image and second image to the authentication data of the pre-determined item further comprises comparing the sparse depth map to the 3D characteristics of the authentication data of the item.

7. The device of claim 1, wherein the flood illumination source and the structured illumination source are configured to illuminate alternately.

8. The device of claim 1, wherein the flood illumination source and the structured illumination source are configured to illuminate concurrently; and
    wherein the image sensor is configured to collect a combined image of the reflected portion of the flood light and the reflected portion of the structured light.

9. The device of claim 8, the processor being further configured to extract at least a portion of the reflection generated by the structured illumination source from the combined image.

10. The device of claim 1, the imaging sensor being a hybrid imaging sensor with a plurality of domains, at least one of the domains including a plurality of photoreceptors configured to detect visible light and at least one photoreceptor configured to detect infrared light.

11. A method of improved anti-spoofing in 3D image recognition of a user, comprising
    illuminating the user with flood light;
    illuminating the user with structured light; wherein the flood light and the structured light are within a first wavelength range;
    collecting a first image of the user from a reflection of the flood light and a second image of the user from a reflection of the structured light;
    identifying a quantity of landmark areas of the user based on the second image, the quantity consisting of a lower threshold of 5 and an upper threshold of 15;

calculating depth values for the landmark areas to create a sparse depth map of the second image;
comparing the sparse depth map against one or more templates; and
determining whether the sparse depth map matches the one or more templates and authenticate the user.

12. The method of claim 11, further comprising
wherein the one or more templates includes a geometric templates.

13. The method of claim 12, the geometric template being a flat template, a cylindrical template, a spherical template, a prismatic template, a trapezoidal template, or a triangular template.

14. The method of claim 11, further comprising
accessing authentication data of a user; and
comparing the sparse depth map to the authentication data of the user.

15. The method of claim 14, wherein the authentication data includes 3D characteristics of the user,
wherein the template include 3D characteristics of the user.

16. The method of claim 14, wherein the authentication data includes 2D characteristics of the pre-determined item,
wherein the comparing further comprises comparing the depth values to geometric templates.

17. The method of claim 11, wherein illuminating an object with flood light and illuminating structured an object with light performed alternatively.

18. The method of claim 11, wherein illuminating an object with flood light and illuminating an object with structured light are at least partially simultaneous, and
wherein collecting the first image and the second image includes collecting a combined image and extracting the second image from the combined image.

19. The method of claim 11, further comprising
identifying a continuation of the reflection of the structured light beyond the user in the second image; and
determining the second image including a false representation of the user.

20. A system of improved anti-spoofing in 3D image recognition, comprising
a flood illumination source, configured to emit flood infrared light at a first wavelength;
a structured illumination source, configured to emit structured infrared light at the first wavelength;
an imaging sensor, configured to collect a first image of a reflected portion of the flood infrared light and a second image of a reflected portion of the structured infrared light from an object; and
a processor in data communication with the imaging sensor, configured to:
calculate between depth values for a quantity of landmark areas based on the second image, the quantity consisting of a lower threshold of 5 and an upper threshold of 15,
access authentication data of a pre-determined item, wherein the authentication data includes at least 2D characteristics of the pre-determined item,
compare the reflection of the flood infrared light to the 2D characteristics of the pre-determined item,
compare the depth values of the object against geometric templates, and
determine whether the sparse depth map matches the one or more geometric templates to authenticate the user.

* * * * *